United States Patent
Dutta et al.

(10) Patent No.: US 10,606,737 B2
(45) Date of Patent: Mar. 31, 2020

(54) SYSTEM AND METHOD FOR TESTING A RESOURCE CONSTRAINED DEVICE

(71) Applicant: Wipro Limited, Bangalore (IN)

(72) Inventors: Souvik Dutta, Kolkata (IN); Debasish Chanda, Maheshtala (IN); Swarup Mandal, Kolkata (IN)

(73) Assignee: Wipro Limited, Bangalore (IN)

( * ) Notice: Subject to any disclaimer, the term of this patent is extended or adjusted under 35 U.S.C. 154(b) by 448 days.

(21) Appl. No.: 15/463,584

(22) Filed: Mar. 20, 2017

(65) Prior Publication Data

US 2018/0253365 A1    Sep. 6, 2018

(30) Foreign Application Priority Data

Mar. 1, 2017    (IN) .............................. 201741007241

(51) Int. Cl.
*G06F 11/36*    (2006.01)
*G06F 11/22*    (2006.01)

(52) U.S. Cl.
CPC ...... *G06F 11/3684* (2013.01); *G06F 11/2294* (2013.01); *G06F 11/3692* (2013.01)

(58) Field of Classification Search
CPC ............ G06F 11/2294; G06F 11/3684; G06F 11/3692
USPC ................................................ 717/124–135
See application file for complete search history.

(56) References Cited

U.S. PATENT DOCUMENTS

| | | |
|---|---|---|
| 2003/0208542 A1 | 11/2003 | Deming et al. |
| 2006/0179383 A1 | 8/2006 | LaBanca et al. |
| 2008/0120521 A1 | 5/2008 | Poisson et al. |
| 2009/0006066 A1* | 1/2009 | Behm .................. G06F 11/261 703/15 |
| 2013/0196600 A1* | 8/2013 | Capers ................. H04W 24/06 455/41.2 |
| 2015/0025925 A1* | 1/2015 | Moore ................ G06Q 10/063 705/7.11 |
| 2015/0026665 A1* | 1/2015 | Chen ................... G06F 11/3688 717/124 |
| 2015/0331789 A1* | 11/2015 | Ekambaram ........ G06F 11/3664 717/124 |
| 2015/0358810 A1* | 12/2015 | Chao ................. H04W 52/0209 455/418 |
| 2017/0337116 A1* | 11/2017 | Negara ............... G06F 11/3636 |
| 2018/0089068 A1* | 3/2018 | Bhojan ................... H04W 4/50 |

OTHER PUBLICATIONS

Extended European Search Report issued in the European Patent Office in counterpart European Application No. 17178885.4, dated Mar. 20, 2018, 7 pages.

* cited by examiner

*Primary Examiner* — Qing Chen
(74) *Attorney, Agent, or Firm* — Finnegan, Henderson, Farabow, Garrett & Dunner, LLP (57) ABSTRACT

The present disclosure relates to the field of device testing. In one embodiment, a method is provided for testing a resource constrained device. The method includes determining a test case for testing the resource constrained device, and accessing a test script corresponding to the test case. The test script includes a set of mutually independent primitive executables. The method further includes transmitting each of the set of primitive executables to the resource constrained device for execution, and receiving a result corresponding to the execution of the each of the set of primitive executables.

16 Claims, 6 Drawing Sheets

SYSTEM AND METHOD FOR TESTING A RESOURCE CONSTRAINED DEVICE

TECHNICAL FIELD

This disclosure relates generally to device testing, and more particularly to system and method for testing a resource constrained device.

BACKGROUND

Over the past several years, physical size of computing devices has decreased dramatically. Miniature devices having limited computing power, low power requirement, and mini to ultra-mini in form factor, have become ubiquitous and are revolutionizing the way machines could help humans. They are finding wide applications and adaptation in various areas and industries, such as, retail, transportation, defense and healthcare. Due to the nature of such miniature devices and their intended purposes, applications running on them are becoming more and more complex and demand higher quality.

The existing standards for guiding the development process of an application provision for a good amount of testing effort to ensure the quality and robustness of the application. However, in many cases, the development lifecycles of the applications for miniature devices are short, and the exhaustive testing cycle adversely impact time to market. Further, existing test methodologies require significant computing resources (e.g., memory, processing capability, etc.) in a target device. As will be appreciated, the amount of computing resources available on such miniature devices may be very limited, and therefore testing of applications or components in such devices may be limited. For example, a miniature device may not even have enough memory to deploy a full fledge device agent (DA) as required by some of the existing testing methodologies. Moreover, resource availability may vary dynamically during the course of test execution, and may lead to termination of the testing session in such miniature devices. In short, the limited and dynamic resource availability in a miniature device make the existing testing methodologies unfit and ineffective for testing the miniature device.

SUMMARY

In one embodiment, a method for testing a resource constrained device is disclosed. In one example, the method includes determining a test case for testing the resource constrained device. The method further includes accessing a test script corresponding to the test case. The test script includes a set of mutually independent primitive executables. The method further includes transmitting each of the set of primitive executables to the resource constrained device for execution. The method further includes receiving a result corresponding to the execution of the each of the set of primitive executables.

In one embodiment, a system for testing a resource constrained device is disclosed. In one example, the system includes at least one processor and a memory communicatively coupled to the at least one processor. The memory stores processor-executable instructions, which, on execution, cause the processor to determine a test case for testing the resource constrained device. The processor-executable instructions, on execution, further cause the processor to access a test script corresponding to the test case. The test script includes a set of mutually independent primitive executables. The processor-executable instructions, on execution, further cause the processor to transmit each of the set of primitive executables to the resource constrained device for execution. The processor-executable instructions, on execution, further cause the processor to receive a result corresponding to the execution of the each of the set of primitive executables.

In one embodiment, a non-transitory computer-readable medium storing computer-executable instructions for testing a resource constrained device is disclosed. In one example, the stored instructions, when executed by a processor, cause the processor to perform operations including determining a test case for testing the resource constrained device. The operations further include accessing a test script corresponding to the test case. The test script includes a set of mutually independent primitive executables. The operations further include transmitting each of the set of primitive executables to the resource constrained device for execution. The operations further include receiving a result corresponding to the execution of the each of the set of primitive executables.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
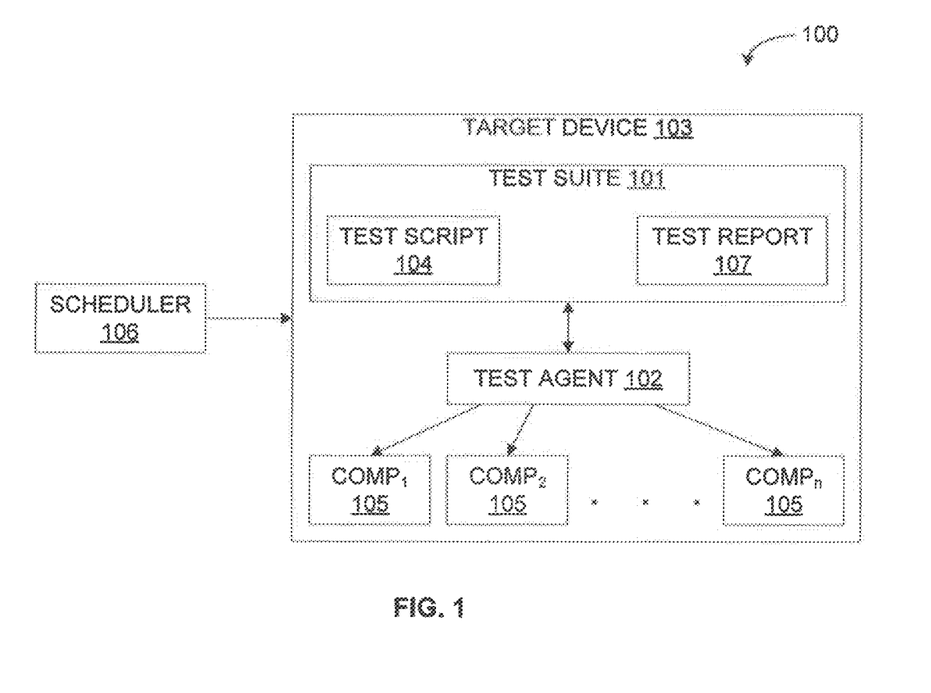
FIG. 1 is a block diagram of a typical system for testing a device.

Referring now to FIG. 1, a typical system 100 for testing a device is illustrated. The system 100 includes a test suite 101 and a test agent 102 deployed within a target device 103. It should be noted that the target device 103 may be a device having adequate computing resources (e.g., storage, processing capability, etc.). For example, the target device 103 may be an enterprise system such as enterprise resource planning (ERP) system, customer relationship management (CRM) system, computer servers, and so forth. The test suite 101 includes a set of test scripts 104 corresponding to various test cases for execution on the target device 103 during testing of the target device 103. The test scripts 104 may be accessed and executed by the test agent 102 during testing so as to test various components 105 ($COMP_1$, $COMP_2$, ... $COMP_n$) of the target device 103. Additionally, a scheduler 106 schedules testing sessions for the target device 103 based on a pre-defined schedule or upon initiations by a user. The result of execution of the test scripts 104 in a testing session may be saved as a test report 107 within the test suite 101. In some embodiments, the test suite 101 may include test reports 107 from multiple testing sessions. The test reports 107 may be subsequently rendered to the users.

During operation, the test agent 102 receives a request for performing test on the target device 103 from the scheduler 106. Upon reception of request from the scheduler 106, the test agent 102 executes the set of test scripts 104 available in the test suite 101 by interacting with various components 105 in the target device 103. The result of execution of the testing scripts 104 in the testing session may be collected as the test report 107 and stored within the test suite 101.

In some embodiments, the test suite and the test agent may reside in a dedicated system remote from the target device, and may perform testing of the target device over a wired or a wireless communication channel. As will be appreciated, such approach may require less computing resources, and may be conveniently employed for a device having moderate computing resources. For example, the target device having moderate computing resources may be an embedded device such as mobile phone, personal digital assistant (PDA), notebooks, laptops, desktop computers, and so forth.

Figure 2:
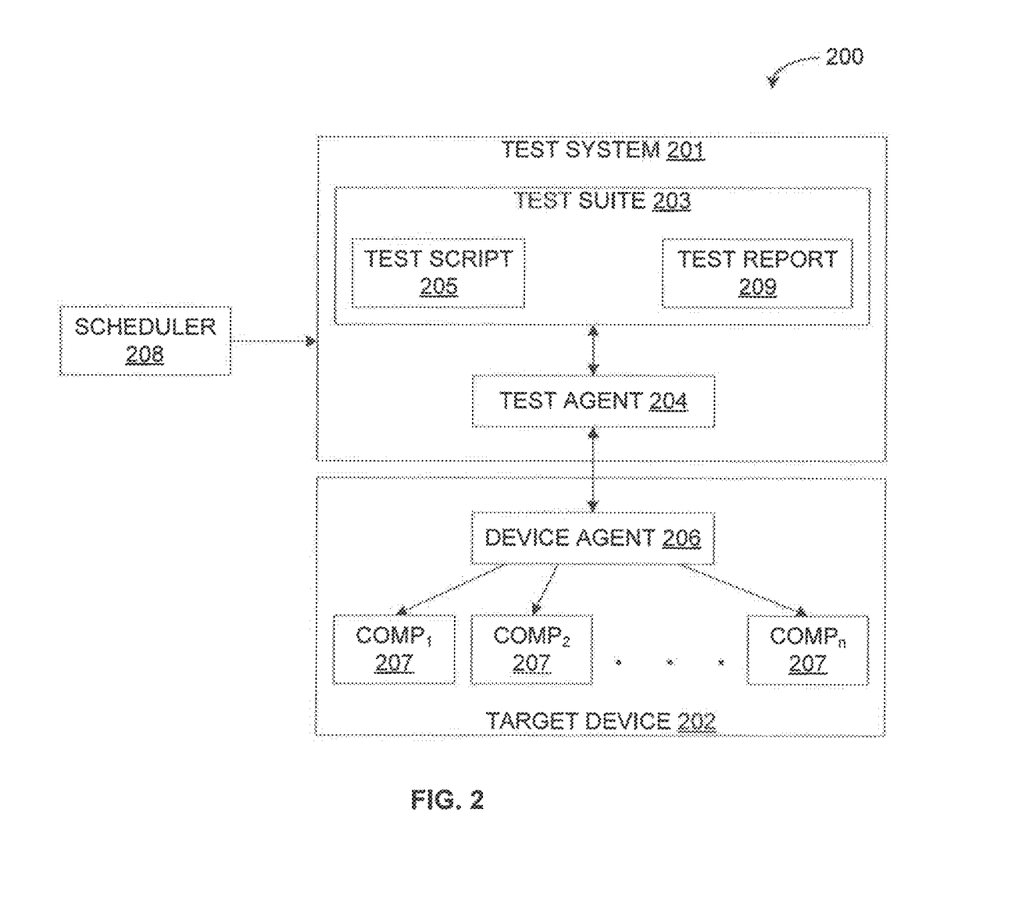
FIG. 2 is a block diagram of another typical system for testing a device.

Referring now to FIG. 2, another typical system 200 for testing a device is illustrated. The system 200 includes a test system 201 remote from one or more target devices 202 to be tested. The test system 201 includes a test suite 203 and a test agent 204. The test suite 203 includes a plurality of test scripts 205 corresponding to various test cases for testing of the target devices 202. One or more of the plurality of test scripts 205 may be accessed by the test agent 204 for execution on a given target device 202.

Each of the target devices 202 includes a device agent 206 that is in communication with the test agent 204 over a wired or a wireless communication channel. As will be appreciated, the communication between the test agent 204 and the device agent 206 may be based on any simple request-response protocol, and may be online or offline. The device agent 206 receives the one or more of the plurality of test scripts 205 from the test agent 204 and executes the received test scripts 205 during testing so as to test various components 207 ($COMP_1$, $COMP_2$, ... $COMP_n$) of the target device 202. A scheduler 208 schedules testing sessions for each of target devices 202 based on a pre-defined schedule or upon initiations by a user. The result of execution of the test scripts 205 in a testing session may be collected by the device agent 206 and sent to the test agent 204. The test agent 204 may then save the result as a test report 209 within the test suite 203. As stated above, the test suite 203 may include test reports 209 from multiple testing sessions from each of the target devices 202. Additionally, the saved test reports 209 may be rendered to the users.

During operation, the test agent 204 receives a request for performing test on a given target device 202 from the scheduler 208. Upon reception of request from the scheduler 208, the test agent 204 may access one or more of the test scripts 205 available in the test suite 203 for the given target device 202. The test agent 204 may then interact with the device agent 206 of the given target device 202 to initiate testing of the given target device 202. The test agent 204 transmits the one or more of the test scripts 205 to the device agent 206, which may then execute the received test scripts 205 by interacting with various components 207 in the target device 202. The result of execution of the testing scripts 205 in the testing session of a given target device 202 may be collected as the test report 209 and stored within the test suite 203.

As stated, the testing techniques discussed above require significant computing resources with respect to miniature computing devices, and therefore may not be suitable for such miniature computing devices. The miniature computing devices may include, but are not limited to, activity trackers, smart watches, smart glass, smart sensors, miniature plug-and-play devices, miniature storage solutions, Internet of Things (IoT) devices, and other wearable devices. These miniature devices may run one or more real-time applications over a light-weight and optimized operating system (e.g., Windows 10 IoT, Google Brillio, RIOT OS, etc.). Such miniature device may not even have enough memory to deploy a full fledge device agent. Moreover, resource availability may vary dynamically during the course of test execution, and may lead to termination of the testing session in such miniature devices. In other words, the limited and dynamic availability of computing resources in such miniature devices make the above discussed testing techniques unfit and ineffective.

It is therefore desirable to provide techniques for testing such miniature computing devices so as to keep up the pace of development without compromising on quality. For example, it is desirable to provide customized techniques for testing a resource constrained device so as to reduce the computational load on the resource constrained device being tested. Additionally, it is desirable to provide optimized testing techniques that is exhaustive yet efficient and cost effective.

Figure 3:
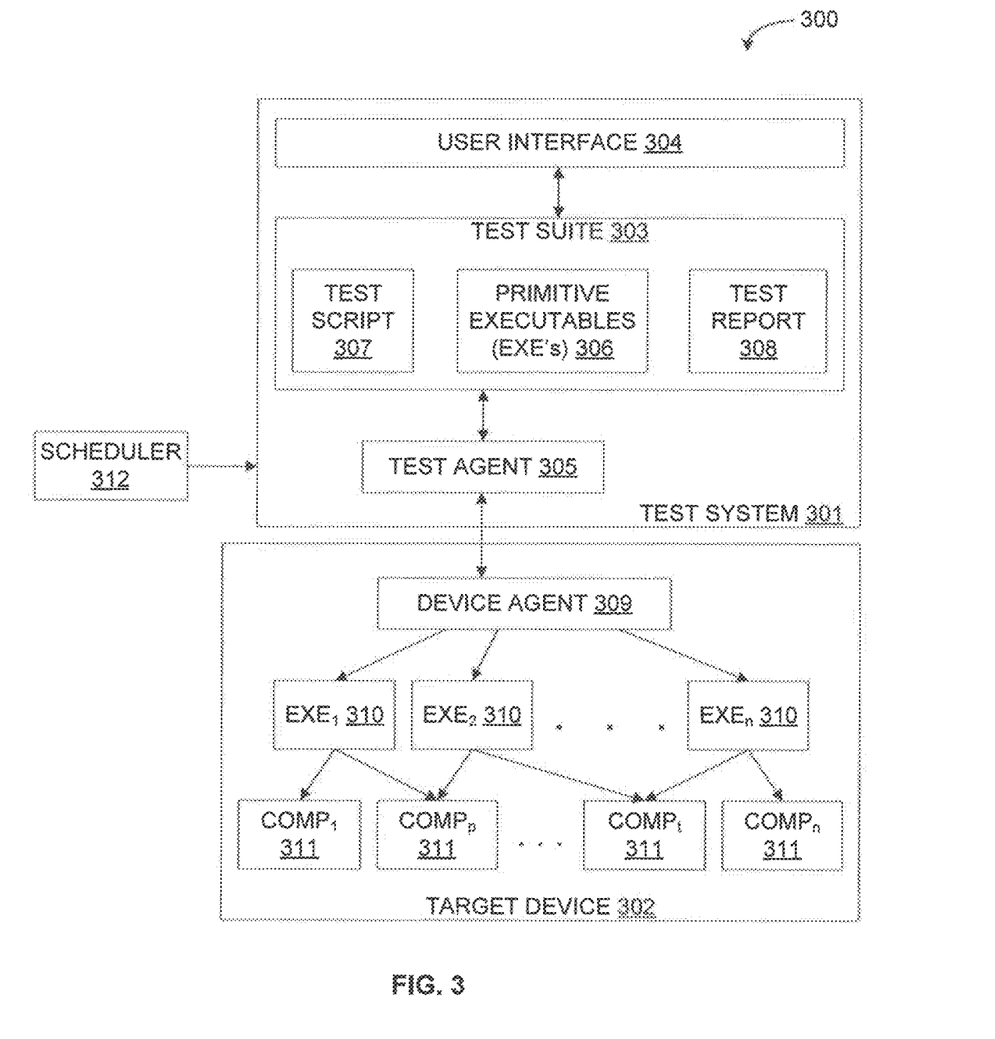
FIG. 3 is a block diagram of an exemplary system for testing a resource constrained device in accordance with some embodiments of the present disclosure.

Referring now to FIG. 3, an exemplary system 300 for testing a resource constrained device is illustrated in accordance with some embodiments of the present disclosure. The system 300 includes a test system 301 remote from one or more target devices 302 to be tested. The target device 102 may also be referred to as device under test (DUT). The test system 301 includes a test suite 303, a user interface 304, and a test agent 305. The test suite 303 includes a number of primitive executables 306 (EXE's), a number of test scripts 307 corresponding to various test cases for testing the target devices 302, and test reports 308. The target device 302 includes a device agent 309 that executes one or more primitive executables 310 ($EXE_1$, $EXE_2$, ... $EXE_n$) received from the test agent 305 by interacting with various components 311 ($COMP_1$, $COMP_p$, ... $COMP_t$, $COMP_n$) in the target device 202.

The primitive executables 306 are executables corresponding to various atomic operations required to be performed the target device 302. The primitive executables 306 may be manually or automatically created to perform the atomic operations. Each of the test scripts 307 correspond to a test case for testing a given target device 302. As will be appreciated, the test case may vary based on the target device 302. The test script 307 may be created using primitive executables 306 corresponding to steps in the test script 307. It should be noted that each of the test steps may contain information on dependent test step. The test script 307 will evaluate the test case by executing primitive executables 306, and comparing the result with expected result mentioned in test case. Each of the test reports 308 is a result of execution of a test script 307 (i.e., related primitive executables 306).

The user interface 304 enables the user (e.g., tester) to upload the test cases. The user interface 304 further enables the user to group the test cases so that a set of test cases may be executed based on a scenario (e.g., stress, regression etc.). Additionally, the user interface 304 enables the user to upload or create test scripts 307 corresponding to the test case. For example, the user interface 304 provides an editor (e.g., WYSIWYG editor) so as to enable the user to create the test script for each of the test cases, and/or to create mapping between test case and test scripts. The user interface 304 also enables the user to generate the test report based on the result of test execution. In some embodiments, the user may view or export the test report in .xls, .doc, .pdf, or any other pre-defined or user selected format. Further, the user interface 304 enables the tester to upload or create target device specific primitive executables 306 for each of the uploaded or created test scripts 307.

The test agent 305 interacts with one or more target devices 302 via corresponding device agents 309 using any simple request-response protocol. In some embodiments, the test agent 305 communicates with the device agent 309 via a test TP that acts as a bearer for the communication with the device agent 309. As will be appreciated, a scheduler 312 triggers a test session to perform the testing on the target device 302. In some embodiments, the scheduler 312 selects the appropriate test case from the test suite 303 and a target device 302 using the user interface 304, and triggers a test session via the test agent 305. The test agent 305 accesses the primitive executables corresponding to the test script which in turn corresponds to the selected test case, and provides the same to the device agent 309 of the selected target device for execution. The test agent 305 further receives the result of execution of the primitive executables from the target device 302, and compiles the same to determine the result of execution of the test script 307. The result is provides to the test suite 303 as test report 308.

The device agent 309 in each of the target device 302 communicates with the test agent 305 of the test system 301. In some embodiments, the device agent 309 communicates with the test agent 305 via a device TP that acts as a bearer for the communication with the test agent 305. The device agent 309 executes the commands received from the test agent 305. Thus, the device agent 309 executes the test script 307 corresponding to the test case on the target device 302 as per the instructions received from the test agent 305. The device agent 309 receives the primitive executables 310 corresponding to the test script 307, and executes the same by interacting with various components 311 in the target device 302. The device agent 309 further provides result of execution of the primitive executables 310 to the test agent 305. Additionally, the device agent 309 determines availability of computing resources in the target device 302 and intimates the test agent 305 of the same. As will be appreciated, the determination of the availability may be performed at periodic interval, or upon request by the test agent 305 at run time. The periodicity may be pre-defined based on the nature of the target device.

Thus, each test script 307 is composed of a set of primitive atomic operations. To execute these atomic operations appropriate primitive executables 306 may be developed for each such operation. The test agent 305 executes the test scripts by sending the set of primitive executables 306 to the device agent 309 for performing the corresponding operations. As will be appreciated, the primitive executables are smaller in size, and interact with components 311 of the target device 302. The test agent 305 considers availability of resource in runtime and sequence the test executions to overcome the resource constraint at run time while ensuring optimum test execution time and component coverage.

By way of example, the user creates or uploads multiple primitive executables 306 via the user interface 304. The user further creates a test script 307 corresponding to a test case using multiple primitive executables 306 via the user interface 304. During operation, the test agent 305 receives a request for performing test on a given target device 302 from the scheduler 312. Upon reception of request from the scheduler 312, the test agent 305 may access primitive executables related to the test script 307 for the given target device 302, and provides the same to the device agent 309 for execution. The test agent 305 first determines availability of computing resources on the given target device 302 through the device agent 309. The test agent 305 then provides the related primitive executables to the device agent 309 in sequence or in batches based on resource availability in the target device 302. The device agent 309 executes the test script 307 by executing the related primitive executables 310 as received, and provides the result of execution back to the test agent 305. The test agent 305 receives the results of execution of primitive executables 310 upon each execution, and aggregates the same once the results of execution of all primitive executables have been received so as to determine the result of execution of the test script 307 on the target device 302. The test agent 305 then provides the result of execution of the test script 307 as test report 308.

It should be noted that the above discussed subsystems, components, engines, modules, agents, etc. may be implemented in programmable hardware devices such as programmable gate arrays, programmable array logic, programmable logic devices, and so forth. Alternatively, the subsystems, components, engines, modules, agents, etc. may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code may be a single instruction, or many instructions, and may even be distributed over several different code segments, among different applications, and across several memory devices. For example, as will be appreciated by one skilled in the art, all such aforementioned modules (e.g., test suite 303, user interface 304, test agent 305, device agent 309, scheduler 312, etc.) may be represented as a single module or a combination of different modules. Further, as will be appreciated by those skilled in the art, each of the modules may reside, in whole or in parts, on one device or multiple devices in communication with each other.

Figure 4:
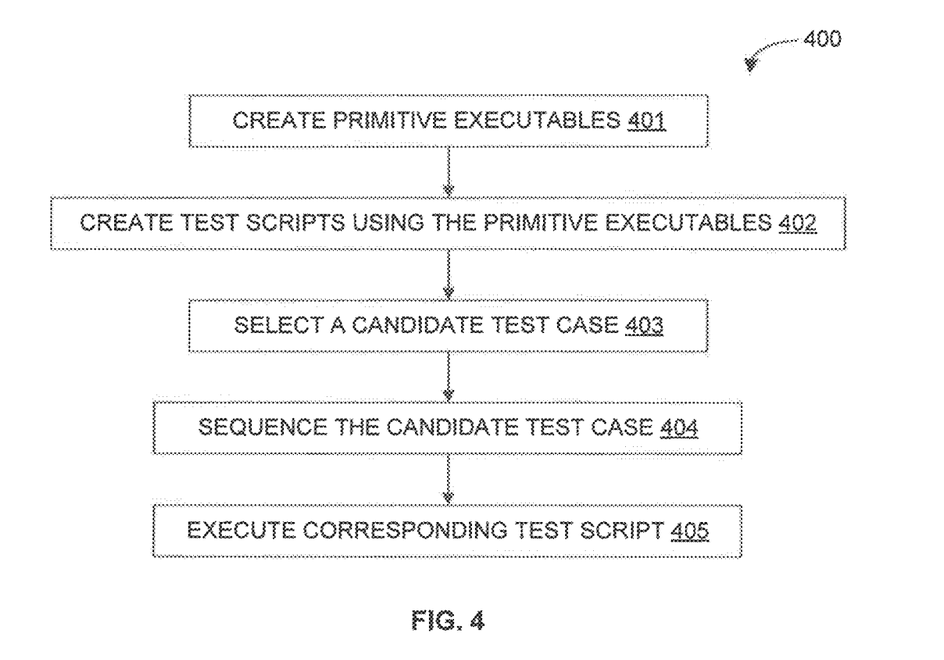
FIG. 4 is a flow diagram of an exemplary process overview for testing a resource constrained device in accordance with some embodiments of the present disclosure.

Referring now to FIG. 4, an overview of exemplary process 400 for testing a resource constrained device is depicted via a flowchart in accordance with some embodiments of the present disclosure. The process 400 involves the steps of creating primitive executables at step 401, creating test scripts using the primitive executables at step 402, selecting a candidate test case at step 403, sequencing the candidate test case at step 404, and executing the corresponding test script at step 405. Each of these steps will be described in greater detail herein below.

At step 401, the process 400 identifies the set of atomic operations required to be performed on the target device (i.e., device under test). The process 400 further creates or enables creation of primitive executables that run independently corresponding to the set of atomic operation. The process 400 then estimate resource usage requirement (e.g., memory, MIPS, etc.) for each of the primitive executables. The user (e.g., developer, tester, etc.) may upload aforementioned well tested primitive executables into a repository along with following execution parameters: name of the primitive executables, input parameters (e.g., parameters for invocation), output parameters (e.g., response format for the output), estimated time for execution, estimated resource usage, estimated component coverage, and so forth. As will be appreciated, the repository may be subsequently referred by the test agent.

At step 402, the process 400 creates or enables creation of test scripts using primitive executables created at step 401. It should be noted that the test scripts correspond to test cases. The process 400 determines various steps for each of the test scripts, and then determines one or more primitive executables for each of the plurality of steps. It should be noted that the intended objective of a test step should be typically achieved by executing one or more number of primitive executables. As will be appreciated, the list of primitive executables to be executed may be mentioned along with their corresponding input parameters so as to perform the test step. Further, each test step may be mentioned along with its predecessor test step if it has dependencies. Additionally, the test step may mention one or more primitive executables that may be executed in batch and that has no dependencies. As will be appreciated, multiple primitive executables may run in parallel if they are not dependent. This will improve the test execution process. The result (i.e.; PASS/FAIL) of the test script may be computed, and test report may be generated or updated based on the result for execution of each of the primitive executables corresponding to the test script.

In some embodiments, the steps of creating test script using primitive executables may be performed using WYSIWYG editor. The test scripts may be stored into the repository along with following execution parameters: estimated time for execution, estimated resource usage, estimated component coverage, and so forth. The execution parameters of a test script (i.e., script execution parameters) are determined based on execution parameters of the related primitive executables (i.e., executable execution parameters). Thus, the estimated resource usage, the estimated time for execution, and the estimated component coverage of a given test script may be determined respectively from the estimated resource usage, estimated time for execution, and estimated component coverage of related primitive executables. Alternatively, in some embodiments, the estimated component coverage of a given test script may be provided by a user (e.g., test designer) by analyzing the impact of the test script on the components.

At step 403, the process 400 determines the test case for testing the resource constrained device. The candidate test case may be determined by computing a test score for each of a plurality of test cases based on a plurality of script execution parameters for a corresponding test script, and selecting the test case based on the test score for each of the plurality of test cases. The test score for each test case may be computed as described herein below.

First, resource usage (RU) may be computed as a function f(·) of resource required by the test case and resource available in the target device for all resources (e.g., memory, MIPS, etc.) in the target device, in accordance with equation (1):

$$RU = f(TR_1/R_1, \ldots, TR_n/R_n) \quad (1)$$

The $TR_i$ represents the resource requirement for the test case and $R_i$ represents resource available in the target device for $i^{th}$ resource (where I=1 . . . n). In other words, the function f(·) may be decided based on the resource handling capability of the target device.

Second, test case preference (X) may be computed as function g(·) of time to execute test case (TE) and component coverage (CC), in accordance with equation (2):

$$X = g(TE, CC) \quad (2)$$

In other words, the function g(·) may be decided based on requirement.

Finally, test score (TV) may be computed as function h(·) of the resource usage (RU) and the test case preference (X), in accordance with equation (3):

$$TV = h(RU, X) \quad (3)$$

At step 404, the process 400 determines sequence of the test case based on the highest test score. Thus, the test case with highest TV value may be selected as next test case for execution. At step 405, the process 400 executes the test script corresponding to the selected test case (i.e., test case with highest test score). The process 400 access the test script corresponding to the selected test case. The process 400 then checks the available resources in the target device. The availability of resources in the target device may be determined by the test agent based on the information received from the device agent of the target device. The device agent reports about the available resources in the target device at a periodic interval or at run time.

The process 400 then transmits the primitive executables related to the selected test script to the target device for execution. Thus, the test agent pushes one or more of the primitive executables related to the test script to the device agent in the target device. In some embodiments, the test agent pushes the primitive executables to the device agent in batches. The transmission may be over a serial or parallel communication channel, or over a wired or wireless communication network. As will be appreciated, the transmission may be performed based on the availability. Thus, the one or more of the primitive executables are transmitted only if the target device has enough resources at run time.

The device agent executes the received primitive executables and send the result to the test agent upon execution. The test agent receives the result from the device agent and computes the intermediate result. The above process is repeated till all primitive executables related to the test script (i.e., all test steps of the test scripts) has been executed. A final result may then be computed by the test agent based on the intermediate result received on each step. The final result may then be stored as test report in the repository and/or rendered to the user.

As will be appreciated by one skilled in the art, a variety of processes may be employed for testing a resource constrained device. For example, the exemplary system 300 may perform testing of the resource constrained device by the processes discussed herein. In particular, as will be appreciated by those of ordinary skill in the art, control logic and/or automated routines for performing the techniques and steps described herein may be implemented by the system 300, either by hardware, software, or combinations of hardware and software. For example, suitable code may be accessed and executed by the one or more processors on the system 300 to perform some or all of the techniques described herein. Similarly application specific integrated circuits (ASICs) configured to perform some or all of the processes described herein may be included in the one or more processors on the system 300.

Figure 5:
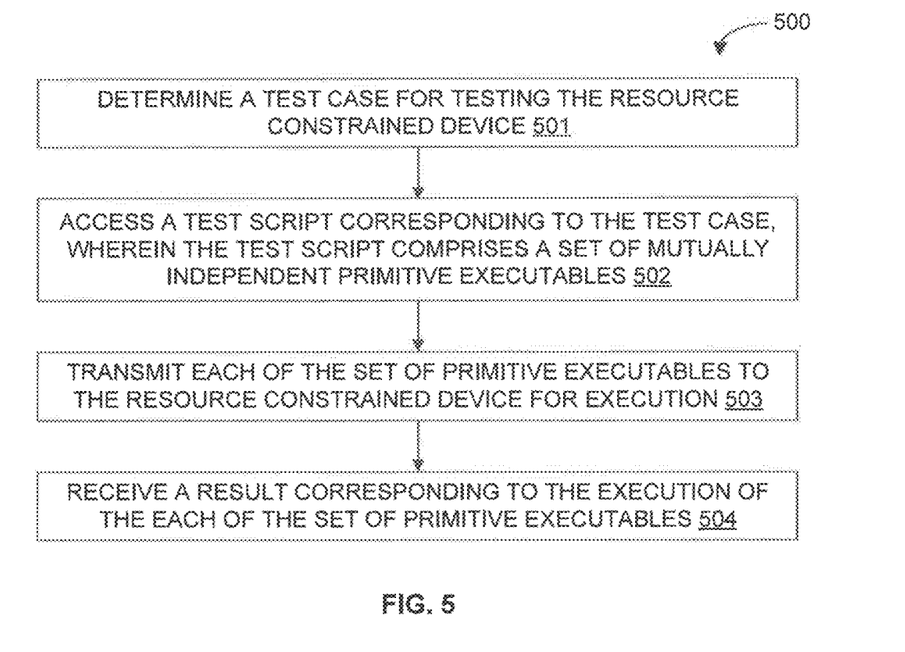
FIG. 5 is a flow diagram of an exemplary process for testing a resource constrained device in accordance with some embodiments of the present disclosure.

For example, referring now to FIG. 5, exemplary control logic 500 for testing a resource constrained device via a system, such as system 300, is depicted via a flowchart in accordance with some embodiments of the present disclosure. As illustrated in the flowchart, the control logic 500 includes the steps of determining a test case for testing the resource constrained device at step 501, and accessing a test script corresponding to the test case at step 502. The test script includes a set of mutually independent primitive executables. The control logic 500 further includes the steps of transmitting each of the set of primitive executables to the resource constrained device for execution at step 503, and receiving a result corresponding to the execution of the each of the set of primitive executables at step 504.

In some embodiments, the control logic 500 further includes the steps of creating a plurality of primitive executables, and determining a plurality of executable execution parameters for each of the plurality of primitive executables. Additionally, in some embodiments, each of the plurality of executable execution parameters includes at least one of a name of the primitive executable, a plurality of input parameters, a plurality of output parameters, an estimated time of execution, an estimated usage of one or more resources, and a coverage of one or more components of the resource constrained device.

In some embodiments, the control logic 500 further includes the steps of creating a plurality of test script corresponding to a plurality of test cases, and determining a plurality of script execution parameters for each of the plurality of test scripts. In some embodiment, creating each of the plurality of test scripts includes determining a plurality of steps of the test script, and determining one or more primitive executables for each of the plurality of steps. Additionally, in some embodiments, the control logic 500 includes the step of determining a dependency of each of the test step with respect to each of a plurality of preceding steps. Further, in some embodiments, the control logic 500 includes the step of determining a batch execution of the one or more primitive executables for each of the plurality of steps. In some embodiments, each of the plurality of script execution parameters includes at least one of an estimated time of execution, an estimated usage of one or more resources, and a coverage of one or more components of the resource constrained device.

In some embodiments, determining the test case includes at step 501 includes computing a test score for each of a plurality of test cases based on a plurality of script execution parameters for a corresponding test script, and selecting the test case based on the test score for each of the plurality of test cases. Additionally, in some embodiments, determining the test case at step 501 further includes sequencing the test case based on the highest test score.

In some embodiments, transmitting each of the set of primitive executables for execution at step 503 includes determining an availability of each of one or more resources in the resource constrained device, and transmitting each of the set of primitive executables to the resource constrained device based on the availability. Further, in some embodiments, the availability of the each of the one or more resources is determined at a periodic interval or at run time.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
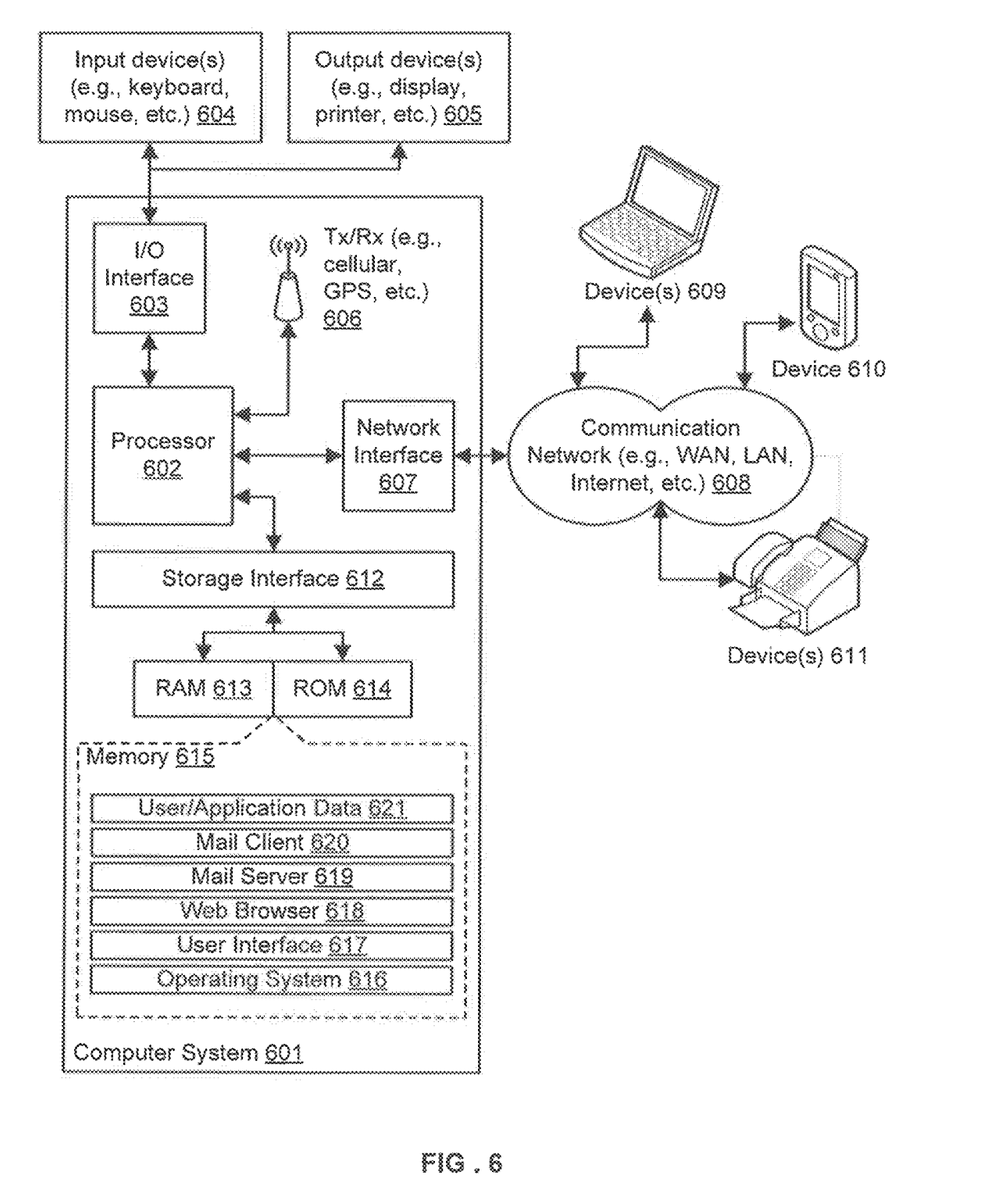
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 300 for testing resource constrained devices. Computer system 601 may include a central processing unit ("CPU" or "processor") 602. Processor 602 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/nix, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C #, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. (e.g., primitive executables, execution parameters of primitive executable, test cases, test scripts, execution parameters of test scripts, execution results, test reports, testing schedules, availability of resources at target devices, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for an optimized, efficient, and cost effective mechanism for testing resource constrained devices. The techniques described in the various embodiments discussed above have novel deployment architecture that suit with the constraints of limited resources in the target device for executing the test cases. The test script is divided into multiple primitive executables corresponding to test steps so as to reduce resource usage to suit resource constraint in miniature devices.

The existing technique require an entire device agent covering all possible scenarios loaded into the target device irrespective of number of test cases executed. The typical size of such device agent may be about 300-400 kilobytes. In contrast, the size of device agent required by the techniques described above is in the order of about 20-30 kilobytes. The device agent disclosed by the techniques described above needs to be capable of executing the primitive executables for performing atomic operation. Additionally, the light weight device agent may also have a positive impact on performance (MIPS).

Additionally, the techniques described in the various embodiments discussed above reduce the probability of failure of test case execution on a resource constrained device since the test case execution are sequenced based on the resource available at target device on run time and estimated resource usage by the primitive executables. For example, in a telematics miniature device with RAM and ROM size of 64 KB and 4 MB respectively, the techniques described in the various embodiments discussed above reduce the probability of failure of test case execution by about 30%.

The specification has described system and method for testing resource constrained devices. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for testing a resource constrained device, the method comprising:
    determining, via a testing engine, a plurality of test cases for testing the resource constrained device;
    accessing, via the testing engine, a plurality of test scripts corresponding to the plurality of test cases;
    determining, via the testing engine, a set of mutually independent primitive executables for the plurality of test scripts corresponding to the plurality of test cases, by:
        determining a plurality of steps of the plurality of test scripts; and
        determining one or more primitive executables for each of the plurality of steps of the plurality of test scripts, wherein the one or more primitive executables for each of the plurality of steps of the plurality of test scripts correspond to one or more atomic operations of the resource constrained device;
    determining, via the testing engine, a candidate test case from the plurality of test cases, wherein the candidate test case from the plurality of test cases is determined based on:
        computing a test score for each of the plurality of test cases based on a plurality of script execution parameters for a corresponding test script, wherein each of the plurality of script execution parameters for the corresponding test script comprises at least one of an estimated time of execution, an estimated usage of one or more resources, and a coverage of one or more components of the resource constrained device; and
        selecting the candidate test case from the plurality of test cases based on the computed test score for each of the plurality of test cases;
    transmitting, via the testing engine, the one or more primitive executables for each of the plurality of steps of the plurality of test scripts corresponding to the candidate test case from the plurality of test cases to the resource constrained device for execution; and
    receiving, via the testing engine, a result corresponding to the execution of the one or more primitive executables for each of the plurality of steps of the plurality of test scripts corresponding to the candidate test case from the plurality of test cases.

2. The method of claim 1, further comprising:
    creating the one or more primitive executables for each of the plurality of steps of the plurality of test scripts; and
    determining a plurality of executable execution parameters for each of the plurality of one or more primitive executables for each of the plurality of steps of the plurality of test scripts.

3. The method of claim 2, wherein each of the plurality of executable execution parameters comprises at least one of a name of the one or more primitive executables for each of the plurality of steps of the plurality of test scripts, a plurality of input parameters, a plurality of output parameters, an estimated time of execution, an estimated usage of one or more resources, and a coverage of one or more components of the resource constrained device.

4. The method of claim 1, further comprising:
    creating the plurality of test scripts corresponding to the plurality of test cases; and
    determining the plurality of script execution parameters for each of the plurality of test scripts corresponding to the plurality of test cases.

5. The method of claim 1, further comprising at least one of:
    determining a dependency of each of the plurality of steps of the plurality of test scripts with respect to each of a plurality of preceding steps of the plurality of test scripts; and determining a batch execution of the one or more primitive executables for each of the plurality of steps of the plurality of test scripts.

6. The method of claim 1, wherein determining the candidate test case from the plurality of test cases further comprises sequencing the candidate test case based on a highest test score.

7. The method of claim 1, wherein transmitting the one or more primitive executables for each of the plurality of steps of the plurality of test scripts corresponding to the candidate test case from the plurality of test cases to the resource constrained device for execution comprises:
  determining an availability of each of the one or more resources in the resource constrained device; and
  transmitting the one or more primitive executables for each of the plurality of steps of the plurality of test scripts corresponding to the candidate test case from the plurality of test cases to the resource constrained device based on the availability of each of the one or more resources in the resource constrained device.

8. The method of claim 7, wherein the availability of each of the one or more resources in the resource constrained device is determined at a periodic interval or at run time.

9. A system for testing a resource constrained device, the system comprising:
  at least one processor; and
  a non-transitory computer-readable storage medium storing instructions that, when executed by the at least one processor, cause the at least one processor to perform operations comprising:
  determining, via a testing engine, a plurality of test cases for testing the resource constrained device;
  accessing, via the testing engine, a plurality of test scripts corresponding to the plurality of test cases;
  determining, via the testing engine, a set of mutually independent primitive executables for the plurality of test scripts corresponding to the plurality of test cases, by:
    determining a plurality of steps of the plurality of test scripts; and
    determining one or more primitive executables for each of the plurality of steps of the plurality of test scripts, wherein the one or more primitive executables for each of the plurality of steps of the plurality of test scripts correspond to one or more atomic operations of the resource constrained device;
  determining, via the testing engine, a candidate test case from the plurality of test cases, wherein the candidate test case from the plurality of test cases is determined based on:
    computing a test score for each of the plurality of test cases based on a plurality of script execution parameters for a corresponding test script, wherein each of the plurality of script execution parameters for the corresponding test script comprises at least one of an estimated time of execution, an estimated usage of one or more resources, and a coverage of one or more components of the resource constrained device; and
    selecting the candidate test case from the plurality of test cases based on the computed test score for each of the plurality of test cases;
  transmitting, via the testing engine, the one or more primitive executables for each of the plurality of steps of the plurality of test scripts corresponding to the candidate test case from the plurality of test cases to the resource constrained device for execution; and
  receiving, via the testing engine, a result corresponding to the execution of the one or more primitive executables for each of the plurality of steps of the plurality of test scripts corresponding to the candidate test case from the plurality of test cases.

10. The system of claim 9, wherein the operations further comprise:
  creating the one or more primitive executables for each of the plurality of steps of the plurality of test scripts; and
  determining a plurality of executable execution parameters for each of the one or more primitive executables for each of the plurality of steps of the plurality of test scripts,
  wherein each of the plurality of executable execution parameters comprises at least one of a name of the one or more primitive executables for each of the plurality of steps of the plurality of test scripts, a plurality of input parameters, a plurality of output parameters, an estimated time of execution, an estimated usage of one or more resources, and a coverage of one or more components of the resource constrained device.

11. The system of claim 9, wherein the operations further comprise:
  creating the plurality of test scripts corresponding to the plurality of test cases; and
  determining the plurality of script execution parameters for each of the plurality of test scripts corresponding to the plurality of test cases.

12. The system of claim 11, wherein the operations further comprise at least one of:
  determining a dependency of each of the plurality of steps of the plurality of test scripts with respect to each of a plurality of preceding steps of the plurality of test scripts; and
  determining a batch execution of the one or more primitive executables for each of the plurality of steps of the plurality of test scripts.

13. The system of claim 9, wherein determining the candidate test case from the plurality of test cases further comprises sequencing the candidate test case based on a highest test score.

14. The system of claim 9, wherein transmitting the one or more primitive executables for each of the plurality of steps of the plurality of test scripts corresponding to the candidate test case from the plurality of test cases to the resource constrained device for execution comprises:
  determining an availability of each of the one or more resources in the resource constrained device; and
  transmitting the one or more primitive executables for each of the plurality of steps of the plurality of test scripts corresponding to the candidate test case from the plurality of test cases to the resource constrained device based on the availability of each of the one or more resources in the resource constrained device.

15. The system of claim 14, wherein the availability of each of the one or more resources in the resource constrained device is determined at a periodic interval or at run time.

16. A non-transitory computer-readable storage medium having stored thereon, a set of computer-executable instructions for causing a computer comprising one or more processors to perform steps comprising:
  determining, via a testing engine, a plurality of test cases for testing a resource constrained device;
  accessing, via the testing engine, a plurality of test scripts corresponding to the plurality of test cases;

determining, via the testing engine, a set of mutually independent primitive executables for the plurality of test scripts corresponding to the plurality of test cases, by:
  determining a plurality of steps of the plurality of test scripts; and
  determining one or more primitive executables for each of the plurality of steps of the plurality of test scripts, wherein the one or more primitive executables for each of the plurality of steps of the plurality of test scripts correspond to one or more atomic operations of the resource constrained device;
determining, via the testing engine, a candidate test case from the plurality of test cases, wherein the candidate test case from the plurality of test cases is determined based on:
  computing a test score for each of the plurality of test cases based on a plurality of script execution parameters for a corresponding test script, wherein each of the plurality of script execution parameters for the corresponding test script comprises at least one of an estimated time of execution, an estimated usage of one or more resources, and a coverage of one or more components of the resource constrained device; and
  selecting the candidate test case from the plurality of test cases based on the computed test score for each of the plurality of test cases;
transmitting, via the testing engine, the one or more primitive executables for each of the plurality of steps of the plurality of test scripts corresponding to the candidate test case from the plurality of test cases to the resource constrained device for execution; and
receiving, via the testing engine, a result corresponding to the execution of the one or more primitive executables for each of the plurality of steps of the plurality of test scripts corresponding to the candidate test case from the plurality of test cases.

* * * * *